Patented Nov. 20, 1945

2,389,352

UNITED STATES PATENT OFFICE 2,389,352

ALUMINUM SILICATE PRODUCT AND
PROCESS OF MAKING SAME

Elbert E. Fisher, St. Louis, Mo.

No Drawing. Substituted for abandoned application Serial No. 442,121, May 7, 1942. This application November 13, 1944, Serial No. 563,319

3 Claims. (Cl. 23—110)

This application is a substitute for my abandoned application Serial No. 442,121, filed May 7, 1942.

This invention relates generally to the manufacture of an aluminum silicate product and more particularly to the manufacture of an aluminum silicate having a different type of crystalline formation whereby improved refractory and abrasive properties are obtained.

The product of the present invention is particularly useful as a refractory in furnaces. Refractories previously suggested for this purpose are attacked by the components of the batches under high temperature conditions and this is particularly true in glass furnaces where there are hot alkali silicates and carbonates present in various types of such batches. For example, the corundum, as well as the mullite forming part of refractories heretofore suggested, is disintegrated by such alkali silicates, particularly barium silicates.

The present product, as determined by applicant, appears to be a definite chemical compound having a formula $(Al_2O_3)_3 \cdot SiO_2$. It has the characteristic of not being disintegrated even under high temperatures by corrosive furnace batches. The new product also has high density and extremely low coefficient of thermal expansion, thus giving it greater mechanical strength than prior similar products and the ability to withstand more rapid changes in temperature without fracture. The material of the product, because of its density and hardness, is also capable of being employed as an abrasive when comminuted and bonded with a suitable binder. It is, therefore, an object of the invention to provide a process of making a new form of aluminum silicate which has improved refractory and abrasive characteristics.

Another object of the invention is to provide a process of manufacturing a novel aluminum silicate hereinafter given the name of corundum silicate and having a formula $(Al_2O_3)_3 \cdot SiO_2$.

Another object of the invention is to provide a process of manufacturing an improved aluminum silicate which will be particularly suitable for furnace linings.

A further object of the invention is to provide a new refractory material capable of withstanding the action of corrosive mixtures at high temperature.

Still a further object of the present invention is to provide a process of treating siliceous and aluminous materials in order to produce an aluminum silicate having certain characteristics.

Other objects of the invention will appear in the following description of the invention:

In carrying out the process of making my improved product a mixture of alumina ($Al_2O_3$) and silica ($SiO_2$) is prepared in proper proportions. This mixture is heated to a temperature sufficiently high to cause interaction between the alumina and silica. It is preferred to actually melt the mixture and bring it to the boiling point so as to insure the completion of the reaction. If this modification of the process is employed, the source of the alumina and silica is not particularly important so long as substantial amounts of deleterious impurities are not present.

In order to better understand the process of making my improved product, a specific example will be described. Diaspore may be employed as the high-alumina clay. A typical sample of diaspore is composed as follows:

| | Per cent |
|---|---|
| Aluminum oxide | 65 to 70 |
| Silicon dioxide | 15 |
| Loss on ignition | 15 to 20 |

When burned, such a diaspore is composed of approximately 80% aluminum oxide and 20% of silicon dioxide.

The plastic clay to be employed may be one having the following analysis:

| | Per cent |
|---|---|
| Aluminum oxide | 35 |
| Silicon dioxide | 50 |
| Loss on ignition | 15 |

When burned, such a plastic clay is composed of approximately 39% of aluminum oxide and 61% of silicon dioxide.

After the diaspore is burned to remove impurities, such as carbonaceous matter, it may be ground to a fineness of 100 mesh, or finer. The plastic clay may also be of a fineness of 100 mesh, or finer, but is incorporated with the diaspore without preliminary burning. This is to avoid converting the colloidal silica present to the silicate as the former appears to more readily react than the latter. These materials are thoroughly mixed dry in the proportions of, for example, 28 pounds of burned diaspore to 29.4 pounds (equivalent to 25 pounds burned) of plastic clay. To this mixture is added sufficient aluminum oxide, either in the form of substantially pure alumina or aluminum hydroxide, that an alumina content of 83.6% is achieved. This is equivalent to 306 parts by weight of alumina to 60 parts of silica, or by molecular ratio, three alumina to one silica. This mixture will, therefore, be composed approximately as shown in the following table where aluminum tri-hydroxide is used:

|  | Al₂O₃ | SiO₂ |
|---|---|---|
| Burned diaspore, 28 pounds | 22 | 5 |
| Plastic clay, 25 pounds (burned equivalent) | 10 | 15 |
| Aluminum tri-hydroxide, 105 pounds | 70 | |
|  | 102 | 20 |

In the foregoing table it will be understood that the plastic clay referred to is actually incorporated in the mixture before burning and in an amount in excess of 25 pounds depending upon the ignition loss due primarily to loss of water of the particular plastic clay employed. It will also be understood that in lieu of employing aluminum tri-hydroxide, any of the other aluminum hydroxides, or even the substantially pure alumina, may be employed.

To the dry mixture of burned diaspore and plastic clay, the aluminum hydroxide (or alumina in any other form) may be added with sufficient water (previously rendered slightly alkaline) to render the mass mouldable. The water employed may be rendered alkaline by dissolving therein sodium hydroxide, ammonium hydroxide or any other suitable alkali. If sodium hydroxide is employed, the solution of one two-hundredths of one per cent (on the weight of the water) produces advantageous results.

After thus incorporating the burned diaspore, plastic clay, alumina (in the form of aluminum tri-hydroxide) and water the entire mass may be aged at a temperature of about 70 degrees Fahrenheit for a period of about twelve hours.

In order to prepare a dense block or shape of the character desired for lining furnaces, such as those for glass and steel, the above described mixture is now subjected to a fusion process. At a temperature of about 4000 degrees Fahrenheit or more such a mixture becomes fused and is preferably brought to a boiling temperature at or above 4200 degrees Fahrenheit to produce a liquid mixture in which reactions are substantially complete. Experimental tests have shown that no fusing and melting will take place at 3500 degrees Fahrenheit. While in such liquid condition the material may be cast into moulds to form blocks or shapes of the character desired. In carrying out the moulding operation it is desirable to preheat the moulds into which the liquid material is to be poured to a temperature of about 3000 degrees Fahrenheit. The interiors of such moulds may be coated with an aluminum silicate, aluminum oxide or graphite. After being poured into the moulds it is desirable to cool the masses slowly.

The process of producing my corundum silicate in accordance with the present invention may be expedited by adding to the raw mixture of burned diaspore, plastic clay and alumina, a quantity of previously formed corundum silicate. Such addition of corundum silicate appears to accelerate the furnace reaction fusion process hereinbefore described.

Refractories composed of corundum silicate, obtained as hereinbefore described, have the particularly advantageous characteristic that they are not subject to expansion and contraction even at high temperatures. Although when subjected to local temperatures as high as 6000 degrees Fahrenheit, such refractories may melt locally, the expansion is practically nil.

As above indicated, the material resulting from the completely fused product provides an improved abrasive when reduced to finely divided form and incorporated with a suitable binder. The abrasive particles are extremely hard, are resistant to shattering and will withstand elevated and rapidly changing temperatures without spalling.

Best results are obtained when the raw materials employed are substantially pure so that the resultant product contains only sight amounts of impurities. The presence of any substantial amounts of alkali or alkaline earth metals renders the material less resistant to corrosive glasses but the presence of titanium in amounts usually encountered appears to have no deleterious effect upon the material. The final product is much denser than previously known alumina silica refractories thus providing increased mechanical strength. Also it is less affected by hot acidic glass mixtures and is only superficially attacked by hot alkaline carbonates present in glass mixtures.

In prior products made by the electric fusion of various proportions of alumina and silica such as sillimanite ($3Al_2O_3.3SiO_2$) and mullite ($3Al_2O_3.2SiO_2$) completely different crystalline formations are produced than in my new product to which I have given the name corundum silicate ($3Al_2O_3.SiO_2$). This is clearly indicated by reference to the solubilities of these various crystalline formations in hot glass solutions as when glass and barium in various forms are mixed and heated to 2600 to 3000 degrees Fahrenheit. Mullite is more soluble than sillimanite whereas corundum silicate is very resistant to the actions of these glass solutions.

I have found it necessary that the raw materials employed should be in proper proportions to produce the tri-aluminum silicate above referred to, but a small excess of either alumina or silica or the presence of small amounts of impurities will not appreciably change the characteristics of the material. For example, satisfactory products have been prepared in which the alumina content has varied between 83 and 84% instead of the 83.6% theoretically required.

Various patents have been issued for different mixtures of aluminum oxide and silica oxide, most of which contain suggestions of mixtures whereby certain crystalline formations are created but none of these disclose my new product or any similar product having its characteristics. For example, the Klein Patent No. 784,621, issued March 14, 1905, calls for a mixture of alumina and silica which may have as wide a variance as from 40% to 95% alumina. There are accompanying statements that no difference in form or in solubility exists in the products of the different percentages. At the present time mullite is still called by some physicists sillimanite yet when placed in a hot barium silicate glass the mullite is dissolved instantly while the sillimanite is slightly resistant in solvency. One writer states that no difference exists between two mixtures of alumina and silica wherein one has 80% alumina and the other 85% alumina. Various investigators have mixed varying proportions of alumina and silica and have made statements that the results are the same. One investigator made a mixture of 80% alumina and 20% silica and stated that the refractory substance was corundum and mullite. With newer physical apparatus it has been found that such refractory actually was a mixture of mullite, corundum and silica. It is thus apparent that no one has heretofore had a conception of my improved product for if such were the case, they would have discovered that the product has a different solubility of its crystals in glass and also a different segregation of crystals in the bonding body (which follows closely the original form of aluminum hydrate and water) than the prior products. My corundum silicate closely follows the style of a tri-aluminum silicate since when such a mixture is heated in the electric furnace within the temperature range of from 4200 degrees Fahrenheit and 5000 degrees Fahrenheit, the corundum silicate is produced. The percentage range of aluminum oxide in the mixture has a variation of less than 1%, either way from 83.6% which is theoretically required.

Mellor's "Inorganic and Theoretical Chemistry," vol. 6, p. 454, Longmans Green Company, London, 1925, shows a phase rule diagram of the binary system which indicates that my compound is not formed. If to his knowledge it were formed then he would have indicated it by a break or maximum on the melting point curve. Mellor shows what is formed as being a mixture of corundum and $3Al_2O_3.SiO_2$. This is not applicant's product as such has no mullite or sillimanite contained therein.

Experimental tests have shown the applicant's product produced by his process is a new product never before obtained. During these tests a product was made embodying the invention and another product was made by employing a mixture of seventy-three percent (73%) alumina and twenty-seven percent (27%) silica. Both products were obtained by firing the mixture above 4200 degrees Fahrenheit. Both products were examined by the most modern apparatus obtainable for photographic exposure analysis. The results were that the product embodying applicant's invention did not contain mullite, sillimanite, or glass yet was corundum silicate. The other product was not free of mullite. This clearly shows that the mixture and the melting temperature were critical and necessary to give the result. As previously mentioned with applicant's mixture no melting was obtained at 3500 degrees Fahrenheit. Therefore, the product obtained cannot be said to be a mere selection of a point along a known fusion curve of alumina-silica mixtures as, for example, that shown by Figure 60 at page 524 of The Chemistry and Physics of Clays by Searle, 2nd edition, London, Ernest Benn, Ltd. (1933). Applicant's mixture point on such a curve shows that fusion takes place at around 3500 degrees Fahrenheit and during cooling mullite will be obtained. Applicant's product is free of mullite.

It has been found that the specific gravity of corundum silicate is 3.30, its index of refraction 1.665 and its hardness 9.+.

While in the foregoing description reference has been made to specific materials and to specific proportions and temperatures, it is to be understood that the invention is not limited to those materials, nor to the exact stated proportions of the specific materials, nor to the exact specific temperatures, it being understood that any suitable raw materials of the character referred to, when mixed in proportions such as to yield three molecules of alumina to each molecule of silica, and fired at a temperature sufficient to bring about the tri-aluminum silicate or corundum silicate reaction are contemplated.

Therefore, being aware of the possibilities of various modifications, variations and adaptations may be made in the example of the process by those skilled in the art without departing from the principles of my invention, I do not intend that its scope be limited except as set forth by the appended claims.

Having fully described my invention, what I claim as new and desire to secure by Letters Patent of the United States is:

1. The process comprising mixing aluminous and siliceous materials in proportions such as to yield a mixture having within less than one percent (1%) of three molecules of alumina to each molecule of silica, firing the mixture to a temperature of at least 4200 degrees Fahrenheit, and then cooling.

2. The process comprising mixing a high-alumina clay such as diaspore, burley, bauxite and the like, with plastic clay, adding aluminum hydroxide in an amount sufficient to provide in the resultant mixture 306 parts, by weight, of aluminum oxide to 60 parts of silicon dioxide, firing the mixture to a temperature between 4200 degrees Fahrenheit and 5000 degrees Fahrenheit, and then cooling.

3. A vitrified product formed by mixing aluminous and siliceous materials containing combined oxygen in proportions within less than one percent (1%) of 83.6% alumina and 16.4% silica, heating the mixture to a temperature between 4200 degrees Fahrenheit and 5000 degrees Fahrenheit and then cooling, said product being characterized by being free of mullite, sillimanite and glass.

ELBERT E. FISHER.